Oct. 28, 1958     E. D. CLARK     2,857,623
MOLDING APPARATUS FOR GAME BIRD DECOYS
Filed Dec. 14, 1954     3 Sheets-Sheet 1
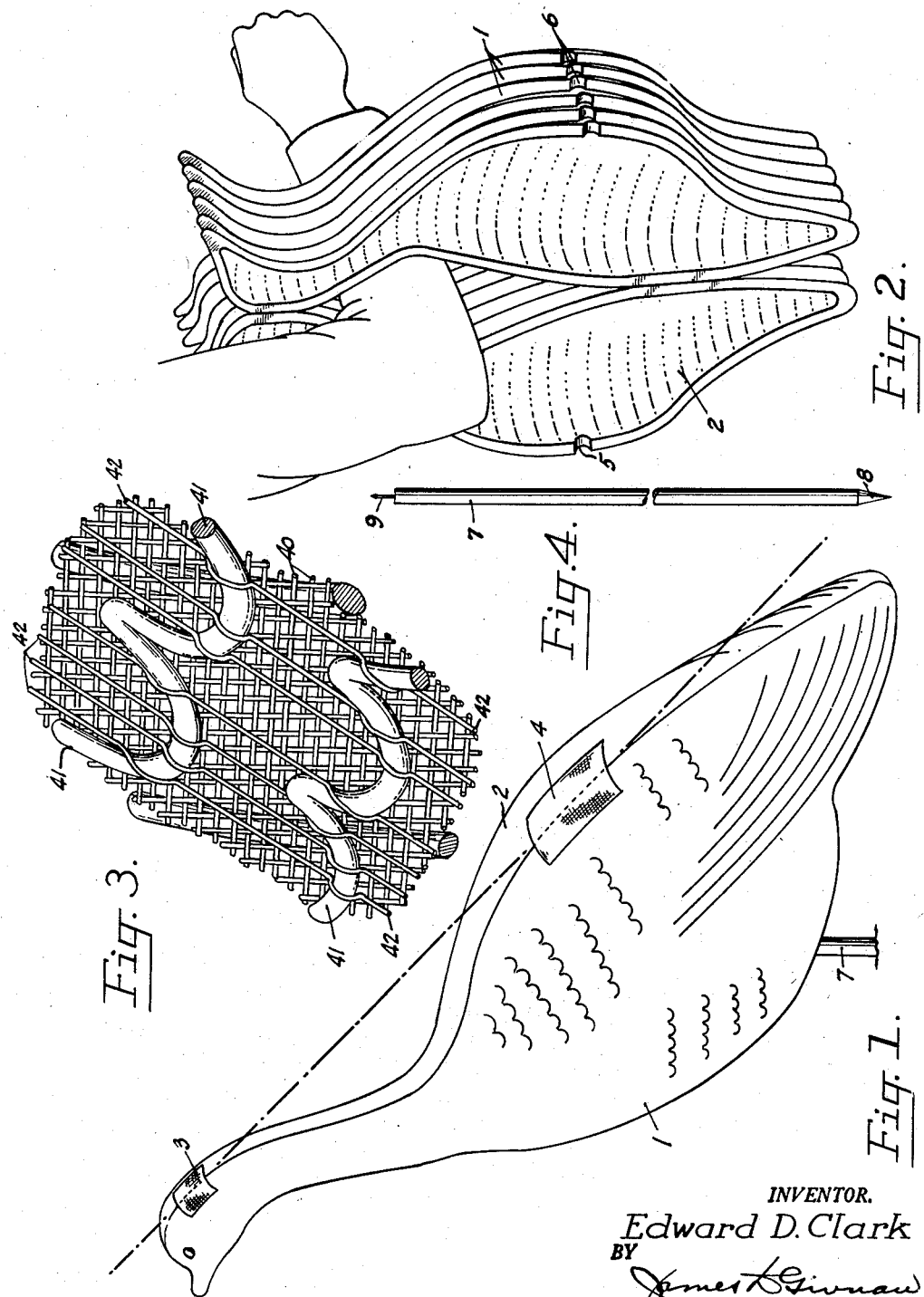
INVENTOR.
Edward D. Clark
BY Oct. 28, 1958     E. D. CLARK     2,857,623
MOLDING APPARATUS FOR GAME BIRD DECOYS
Filed Dec. 14, 1954     3 Sheets-Sheet 2

INVENTOR.
Edward D. Clark
BY

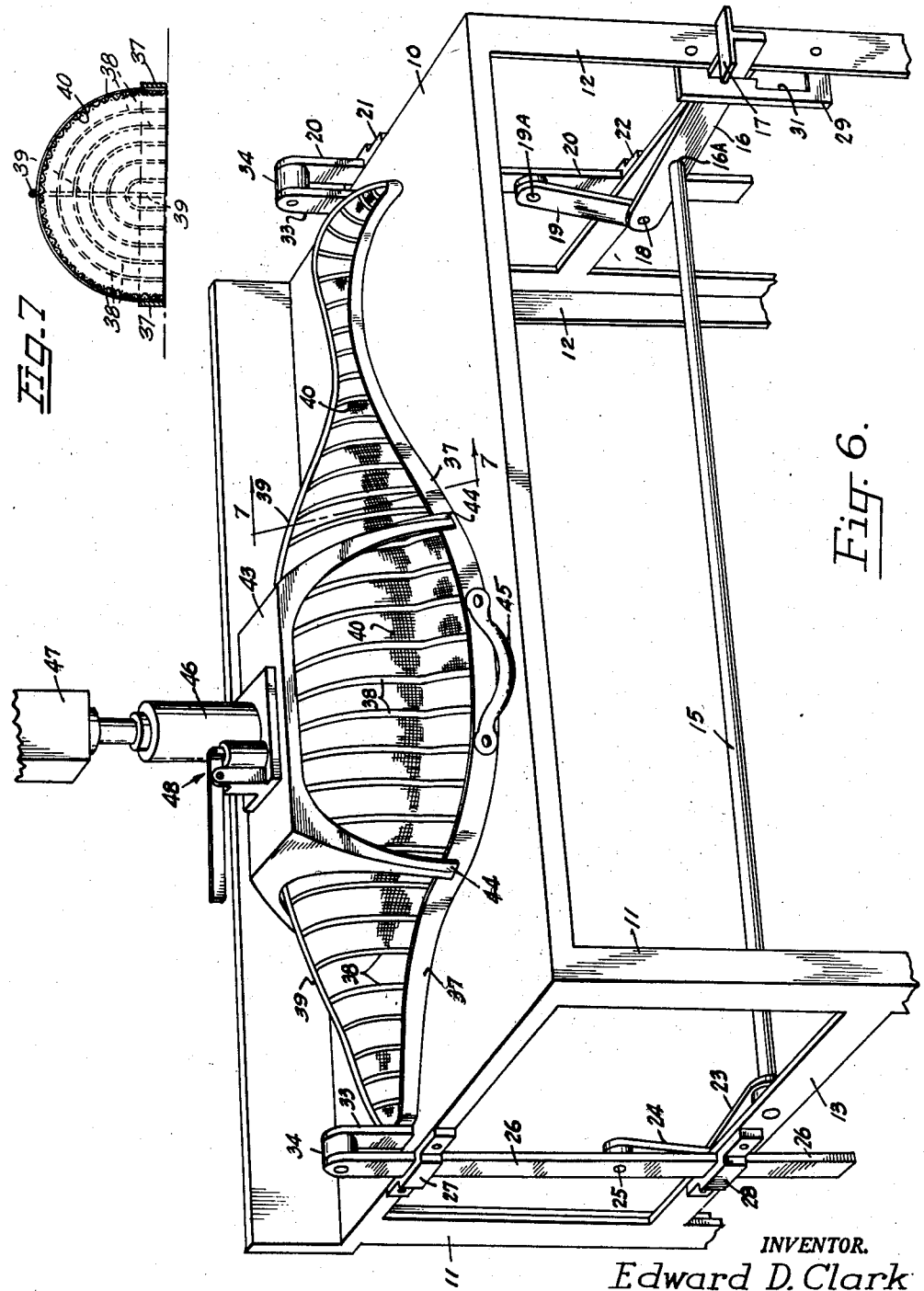

United States Patent Office 2,857,623
Patented Oct. 28, 1958

2,857,623
MOLDING APPARATUS FOR GAME BIRD DECOYS

Edward D. Clark, Hermiston, Oreg.

Application December 14, 1954, Serial No. 475,264

1 Claim. (Cl. 18—34)

This invention relates to improvements in wild game bird decoys and apparatus for and method of producing the same.

It is one of the principal objects of the invention to provide a decoy of lightweight molded material made in two identical half sections hingedly connected in such a way that they may be conveniently nested one within the other in an unfolded position and strung along the arm of a user for carrying purposes and then quickly and conveniently set up for use by moving the two portions about their hinges into a closed position. The decoys are mounted on a stake in such a manner that they will rotate freely into the wind into a natural feeding position with the head portion lowered or in an alert position with the head and forward portion of the body in an elevated position.

A further object is the provision of molding apparatus wherein the molds proper comprise male and female portions each consisting of a framework so constructed as to imprint upon the material being molded a close resemblance to the nature feathers and texture of the surface of the game bird represented by the finished product.

A further object is the provision of apparatus of this character by means of which large quantities of the decoys may be quickly and efficiently produced.

The foregoing and other objects will appear as my invention is more fully hereinafter described in the following specification, illustrated in the accompanying drawings and finally pointed out in the appended claim.

In the drawings:

Figure 1 is a perspective view of a wild game bird decoy made in accordance with my invention.

Figure 2 is a view illustrating the manner in which the unfolded hinged sections of the decoy are nested one within the other and carried on the arm of a user.

Figure 3 is a fragmentary plan view of the wire and woven mesh framework of the mold sections.

Figure 4 is a detail view of a stake adapted to be driven into the ground and upon which the decoy is pivotally mounted so as to swing into the wind in the manner of a weather-vane.

Figure 6 is a view similar to Figure 5 showing the two portions of the mold united under pressure.

Figure 7 is a sectional end view of the female mold portion taken along the line 7—7 of Figure 6.

Figure 5:
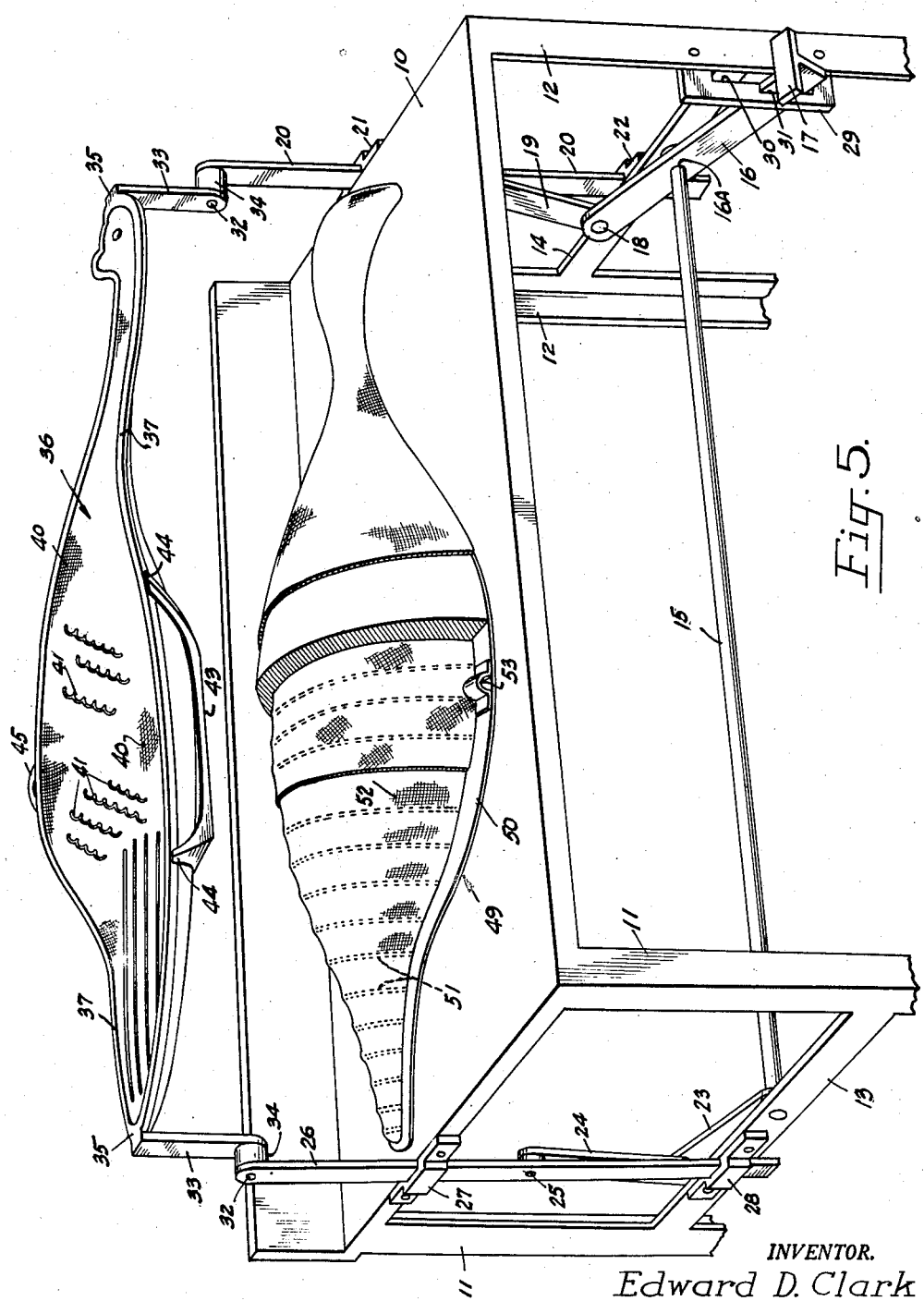
Figure 5 is a perspective view of the molding apparatus and illustrating in a plurality of sections the various material to be molded and applied to the male portion of the mold and also showing the female portion thereof adapted for presentation to the male portion.

Referring now more particularly to the drawings:

In Figures 1 and 2 reference numerals 1 and 2 indicate respectively the left and right identical half sections of the decoy hinged together as at 3 and 4 by any approved type of flexible fabric hinges secured to the half sections by any approved type of waterproof cement or adhesive. Each half section is formed with matching cutouts 5 and 6 to form an aperture when the two half sections are secured together in a closed position. The opening forms one bearing for the pivotal movement of the decoy about a stake 7 pointed as at 8 at one of its ends for driving it into the ground and provided at its opposite end with a pointed pin 9 adapted for selective engagement with the top portion, when folded, of either section 1 and 2 to provide a support and also a pivotal bearing cooperating with the bearing formed by the bottom opening. By this arrangement the decoy may be positioned in a head-down feeding-position or a head-up alert position or in any intermediate position and at the same time be free to pivot into the wind in a natural manner.

The molding apparatus illustrated in Figures 5 and 6 comprises a table having a top 10 supported by pairs of legs 11 and 12 interconnected and braced by cross-members 13 and 14 respectively. Rotatably mounted at each of its ends in the cross-members 13 and 14 is a rod 15. An actuating arm 16 is secured intermediate its ends as at 16A to the rod 15 to impart rotation thereto upon movement of the lever whose one end terminates in a foot pedal 17 and whose opposite end is pivotally attached as at 18 to one end of a link 19 whose opposite end is pivotally attached as at 19A to a vertical bar 20 which is slidably mounted for vertical movement within brackets 21 and 22 secured respectively to one end of the table top 10 and to the cross-member 14. To the opposite end of the rod 15 I secure one end of a lever arm 23 whose opposite end is pivotally attached to one end of a companion arm 24 whose opposite end is pivotally attached as at 25 to a companion vertical bar 26 slidably mounted within brackets 27 and 28 secured respectively to the table top 10 and to the cross-member 13.

Secured to one of the legs 12 of the table is a plate 29 which is slotted as at 30 to slidably embrace the actuating arm 16 and notched as at 31 to engage with the outer end of the arm to lock it in a downwardly inclined position, as best illustrated in Figure 5. Secured to and extending inwardly from the upper end of each vertical bar 20 and 26 is a stub shaft 32. To the inner end of each stub shaft I swingably attach a link 33 which is held in spaced relation to the upper end of each bar by means of spacers in the form of collars 34. The links 33 may be formed integral as at 35 with or secured to the ends of a female mold 36 which in this case is in the form of one-half of the goose decoy shown in Figures 1 and 2. This mold as best shown in Figure 6 consists of an outline base frame 37 provided with interconnecting arcuate ribs 38 connected to a stiffening ridge 39 and covered interiorly with wire-mesh 40. The ridge extends throughout the length of the frame and along with the ribs is shaped to conform to the contour of one side of the body of the goose decoy. To the inner surface of the wire-mesh (Figure 3) I secure a plurality of U-shaped wires 41 by means of longitudinal wires 42 permanently secured to the wire-mesh. The wires 41 mold the outline of the trailing ends of feathers on the exterior surface of the decoy body during the molding operation.

To this half section of the mold I secure a pressure table 43 having legs 44 whose lower ends are secured by any suitable means such as welding or the like to the base frame 37 and by means of the ridge 39 to the ribs 38 to thereby exert downward pressure evenly throughout the length and width of the mold. For convenience in manipulating this portion of the mold, independent of the arms 33, I secure a handle 45 to one side of the frame 37. Superimposed upon the pressure table 43 and adapted to exert controlled downward pressure thereagainst is any approved type of hydraulic jack 46 whose one end bears against the table and whose opposite end bears against any approved type of abutment 47 and actuated by a pumping mechanism generally indicated at 48 which when operated in one direction will force the mold downwardly and which when actuated in the opposite direction will release the pressure to free the mold so that it may be lifted either by the handle 45 or by downward foot pressure on the outer end of the actuating arm 16.

Cooperating with the female mold 36 is a male mold generally indicated at 49 in Figure 5 which comprises a frame 50 supported upon or attached to the table top 10 and provided with transverse arcuate ribs 51 exteriorly covered with wire-mesh 52. An inverted U-shaped element 53 is secured to one side of the frame 50 to form the matching openings 5 and 6 in the finished half-sections as above referred to.

With the male mold in position upon the table top 10, I apply to it a covering of fabric such as cheesecloth or the like and over this covering I apply and spread evenly a plastic mixture of dry paper pulp, fibrous plaster, Casco resin, and water. Following this the female mold 36 is swung downwardly to overlie the male mold. The hydraulic jack 46 is then actuated to apply the necessary pressure to mold the plastic mixture between the molds where it is allowed to remain until dry and ready for removal as a finished product.

While I have shown a particular form of embodiment of my invention I am aware that many minor changes therein will readily suggest themselves to others skilled in the art without departing from the spirit and scope of the invention. Having thus described my invention what I claim as new and desire to protect by Letters Patent is:

A mold for forming identical halves of a bird decoy adapted to be hinged together for folding outwardly for nesting one within the other for transportation or for folding together in the form of the outline of a bird, said mold comprising a male and a female member, each of said mold members comprising a flat outline base frame, transverse arcuate ribs secured at their ends to the frame and along their top to a ridge extending from its center to both ends of the frame and secured thereto, the male mold member having its flat outline base frame fixed upon a flat support, the female mold member being rotatable through an arc of substantially 180° on a horizontal axis while reciprocably moveable into and out of molding relation with respect to the male mold member, a pressure table superimposed upon and attached to the flat base frame of the female mold and to the ridge thereof whereby downward pressure upon the pressure table will be evenly distributed throughout the length and width of the female mold member during molding operations, a wire-mesh covering attached to the underside of the ribs of each of said mold members, and a plurality of irregularly shaped projections secured by wires to the underside of the wire-mesh covering of the female mold to form correspondingly shaped depressions in material being molded between the molds to simulate the feathers of a bird.

References Cited in the file of this patent

UNITED STATES PATENTS

| | | |
|---|---|---|
| 1,133,820 | Richert | Mar. 30, 1915 |
| 1,307,796 | Sperry et al. | June 24, 1919 |
| 1,560,117 | Stevenson et al. | Nov. 3, 1925 |
| 1,574,565 | Ferguson | Feb. 23, 1926 |
| 1,671,577 | Glucken et al. | May 29, 1928 |
| 1,946,244 | Smith | Feb. 6, 1934 |
| 2,356,860 | Lewis | Aug. 29, 1944 |
| 2,583,262 | Glaab | Jan. 22, 1952 |
| 2,615,202 | Talalay | Oct. 28, 1952 |
| 2,618,130 | Leichtman et al. | Nov. 18, 1952 |
| 2,642,919 | Kingman | June 23, 1953 |

FOREIGN PATENTS

| | | |
|---|---|---|
| 175,540 | France | Apr. 16, 1886 |